United States Patent
Levy (10) Patent No.: US 10,601,876 B1
(45) Date of Patent: Mar. 24, 2020

(54) DETECTING AND ACTIVELY RESOLVING SECURITY POLICY CONFLICTS

(71) Applicant: CyberArk Software Ltd., Petach-Tikva (IL)

(72) Inventor: Amir Levy, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/697,313

(22) Filed: Nov. 27, 2019

(51) Int. Cl.
| G06F 17/00 | (2019.01) |
| H04L 29/06 | (2006.01) |
| G06N 20/00 | (2019.01) |
| H04L 29/08 | (2006.01) |

(52) U.S. Cl.
CPC .............. *H04L 63/20* (2013.01); *G06N 20/00* (2019.01); *H04L 63/102* (2013.01); *H04L 67/10* (2013.01)

(58) Field of Classification Search
CPC ....... H04L 63/20; H04L 63/102; H04L 67/10; G06N 20/00
See application file for complete search history.

(56) References Cited

U.S. PATENT DOCUMENTS

| 7,349,961 | B2 * | 3/2008 | Yamamoto | .......... H04L 43/0811 709/224 |
| 8,490,163 | B1 * | 7/2013 | Harsell | ................. G06F 21/554 726/12 |
| 2010/0011027 | A1 * | 1/2010 | Cox | ........................ G06Q 10/00 707/E17.005 |
| 2015/0180907 | A1 * | 6/2015 | Masrani | ................. H04L 63/205 726/1 |
| 2017/0206351 | A1 * | 7/2017 | Jay | ........................ G06F 21/552 |
| 2017/0288952 | A1 * | 10/2017 | Clark | ................... H04L 41/0866 |
| 2018/0324218 | A1 * | 11/2018 | Xie | .......................... H04L 41/12 |

\* cited by examiner

*Primary Examiner* — Baotran N To
(74) *Attorney, Agent, or Firm* — Finnegan, Henderson, Farabow, Garrett & Dunner, LLP (57) ABSTRACT

Disclosed embodiments relate to systems and methods for identifying inconsistencies between network security applications. Techniques include identifying a plurality of network security applications, each having a corresponding network security policy; determining that at least one of the plurality of network security applications has a corresponding network security policy that does not comply with a normalization model; implementing the network security policy that does not comply with the normalization model on an endpoint computing resource; determining a result of the implementing with respect to a requested action on the endpoint computing resource; identifying, based on the result of the implementing, at least one inconsistency between how the plurality of network security applications address the requested action; and performing, based on the identifying of the inconsistency, at least one of: generating a report identifying the inconsistency, or reconciling the identified inconsistency.

20 Claims, 6 Drawing Sheets

DETECTING AND ACTIVELY RESOLVING SECURITY POLICY CONFLICTS

BACKGROUND

Modern cybersecurity platforms are highly fragmented. In a given network environment, one application may be implemented to protect email communications, another may analyze potentially malicious files, another may perform behavioral analysis of user actions, another may scrutinize incoming or outgoing network traffic, and another may protect a DevOps code pipeline. Many enterprises have many more security applications running in their environment, each performing a single dedicated task or a handful or related tasks.

In addition to the administrative and overhead burdens involved in decentralized cybersecurity protection, security problems may arise. For example, when two or more security applications reach conflicting decisions about how to handle a particular action (e.g., downloading a file, writing data to a server, creating a new cloud computing account, accessing a secure database, etc.), insecurities may occur. If one security application determines that the action should be permitted, and another decides to block it, there is no decision-making as to which of the conflicting decisions should override the other. Similarly, even if two security applications are identical in terms of their functionality, they may deviate from each other in terms of timing. If one security application calls for an action to be performed at a particular time (e.g., based on a particular time zone), and another security application calls for the action to be performed at a different time (e.g., based on a different time zone), conflicts may also arise in the operation of the respective security applications.

These types of conflicts among applications lead to both false positives and false negatives. If the security measure an organization should implement (e.g., denying access) is overridden by an unsound or erroneous measure (e.g., granting access), the result may be a security vulnerability where the organization becomes compromised to attacks. Conversely, if proper decisions to grant access are overridden by unsound or erroneous decisions to block access, workflows may be disrupted and negative impacts will occur n terms of network uptime and productivity.

As cyberattacks increase in their complexity, the move toward fragmented and highly specialized cybersecurity platforms is likely to continue. No single platform will be able to protect against varying attacks occurring in new and different ways. The result of this is likely to be an increase in conflicts between cybersecurity platforms. No solutions exist for identifying these conflicts among disparate cybersecurity platforms and addressing them in an efficient and security-oriented manner.

Accordingly, in view of these and other deficiencies in existing techniques for addressing inconsistencies among varying cybersecurity platforms, technological improvements are needed for automatically identifying such inconsistencies. Techniques should allow for automatic remediation of inconsistencies in a secure manner, and/or prompts for security administrators to resolve such inconsistencies.

SUMMARY

Various disclosed embodiments describe non-transitory computer readable media, systems, and methods for identifying inconsistencies between network security applications.

For example, in an exemplary embodiment, there may be a non-transitory computer readable medium including instructions that, when executed by at least one processor, cause the at least one processor to perform operations for identifying inconsistencies between network security applications. The operations may include identifying a plurality of network security applications, each having a corresponding network security policy; determining that at least one of the plurality of network security applications has a corresponding network security policy that does not comply with a normalization model; implementing the network security policy that does not comply with the normalization model on an endpoint computing resource; determining a result of the implementing with respect to a requested action on the endpoint computing resource; identifying, based on the result of the implementing, at least one inconsistency between how the plurality of network security applications address the requested action; and performing, based on the identifying of the inconsistency, at least one of: generating a report identifying the inconsistency, or reconciling the identified inconsistency.

According to a disclosed embodiment, reconciling the identified inconsistency includes implementing a least-privilege policy, the least-privilege policy specifying at least one of: a scope of privileged access for the requested action, or a duration of privileged access for the requested action.

According to a disclosed embodiment, the normalization model includes defined parameters of the plurality of network security applications, the defined parameters including at least rules for: blocking or allowing operations with privileged access permissions, and blocking or allowing access to resources.

According to a disclosed embodiment, the normalization model is developed by running a synchronization process on a plurality of security parameters of the plurality of network security applications.

According to a disclosed embodiment, the security parameters are based on one or more of: identity data, execution time, execution argument, file location, file name, file size, file hash, publisher, file type, creation time, update time, origin, author, privilege level, input, and output.

According to a disclosed embodiment, identifying the at least one inconsistency includes: identifying at least one of the plurality of network security applications that has a corresponding network security policy that does comply with the normalization model; determining a treatment of the requested action on the endpoint computing resource based on the at least one of the plurality of network security applications that has the corresponding network security policy that does comply with the normalization model; and comparing the determined treatment to the result of the implementing with respect to the requested action on the endpoint computing resource.

According to a disclosed embodiment, implementing the network security policy that does not comply with the normalization model on the endpoint computing resource includes implementing the network security policy on a virtualized computing resource.

According to a disclosed embodiment, implementing the network security policy on the virtualized computing resource includes executing a program implementing the network security policy on the virtualized computing resource.

According to a disclosed embodiment, the operations further comprise determining that a first and a second of the plurality of network security applications have corresponding network security policies that do not comply with the normalization model.

According to a disclosed embodiment, the operations further comprise implementing the corresponding network security policies for the first and the second of the plurality of network security applications, respectively, on a first and a second endpoint computing resource.

According to another disclosed embodiment, there may be a compute implemented method for identifying inconsistencies between network security applications. The method may comprise identifying a plurality of network security applications, each having a corresponding network security policy; determining that at least one of the plurality of network security applications has a corresponding network security policy that does not comply with a normalization model; implementing the network security policy that does not comply with the normalization model on an endpoint computing resource; determining a result of the implementing with respect to a requested action on the endpoint computing resource; identifying, based on the result of the implementing, at least one inconsistency between how the plurality of network security applications address the requested action; and performing, based on the identifying of the inconsistency, at least one of: generating a report identifying the inconsistency, or reconciling the identified inconsistency.

According to a disclosed embodiment, reconciling the identified inconsistency includes presenting a selectable option for resolving the identified inconsistency.

According to a disclosed embodiment, reconciling the identified inconsistency includes automatically resolving the identified inconsistency.

According to a disclosed embodiment, automatically resolving the identified inconsistency includes: providing the identified inconsistency to a machine-learning classification system; receiving, from the machine-learning classification system, and based on the security parameters and the requested action, an operation for handling the requested action; and implementing the operation for handling the requested action.

According to a disclosed embodiment, the method further comprises updating the machine-learning classification system based on the implementing of the operation for handling the requested action.

According to a disclosed embodiment, automatically resolving the identified inconsistency includes applying at least one of: a strictest network security policy corresponding to the plurality of network security applications, or a custom network security policy that comprises a prioritization of the plurality of network security applications.

According to a disclosed embodiment, automatically resolving the identified inconsistency includes applying a least-privilege network security policy corresponding to the plurality of network security applications.

According to a disclosed embodiment, the plurality of network security applications are a plurality of different network security applications.

According to a disclosed embodiment, the result of the implementing with respect to the requested action includes at least one of: blocking or allowing the requested action.

According to a disclosed embodiment, the result of the implementing with respect to the requested action includes at least one of: denying or granting access to a privileged access credential.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of identifying inconsistencies between network security applications disclosed herein overcome several technological problems in the fields of network security and network uptime optimization. As described below, network environments may involve various different security applications, each addressing one or more different functionalities, such as network communications, privileged access, downloads, firewall policies, code development, cloud orchestration, and more. Some of the security applications may comply with a normalization schema, while others may not. A normalization schema may have a formalized approach to defining the attributes of a security policy. For example, a normalization schema may define policy operations in terms of identities (e.g., accounts, application identifiers, instance identifiers, individuals, network addresses, etc.), actions (e.g., block, allow with permissions, allow, fetch credential, etc.), and times (e.g., absolute times, time windows or periods, time zones, etc.). The actions and times may be specific as to particular network resources (e.g., servers, databases, virtual instances, etc.).

For security applications that do not comply with the normalization model, an analytical approach may be used to determine whether they conflict in their operations with other security applications. For example, for a given security application that does not comply with the normalization schema, the file properties of its executable may be collected (e.g., execution user, execution date, file location, file name, file size, file hash, publisher, file type, date of creation, date of update, version, origin of file, author, and more). The security application may then be executed in a dedicated endpoint machine (e.g., sandboxed machine, virtual machine, etc.). The results of the execution may be stored and compared to the behavior of other security applications. For example, specific security decisions of the tested security application (e.g., specific instances of denying access, granting access, granting privileges, elevating privileges, modifying privileged group memberships, etc.) and timing data (e.g., execution time, timing of specific actions, time duration, time zone, etc.) may be identified and stored. These specific actions may be compared to the actions of other security applications (e.g., based on their normalized models), and inconsistencies may be identified.

In some embodiments, when an inconsistency is identified between two different security applications (whether compliant with the normalization model, or not), the inconsistency may be automatically reconciled. This may be performed based on a machine learning process, as described below. In some embodiments, the automatic reconciliation involves applying a least-privilege rule (e.g., setting privileges that are granted to a minimal scope or duration for performing a particular action). Further, in some embodiments the inconsistency may be identified (e.g., through a report or prompt), and an administrator can decide how to reconcile the inconsistency. Alternatively, in some embodiments a prompt may be generated allowing an administrator to select one of the conflicting policy decisions to be implemented. In embodiments utilizing a machine learning process, this selection by the administrator may be fed back into the machine learning model, to be used for future conflict resolution (including automatic conflict resolution).

Reference will now be made in detail to the disclosed embodiments, examples of which are illustrated in the accompanying drawings.

Figure 1:
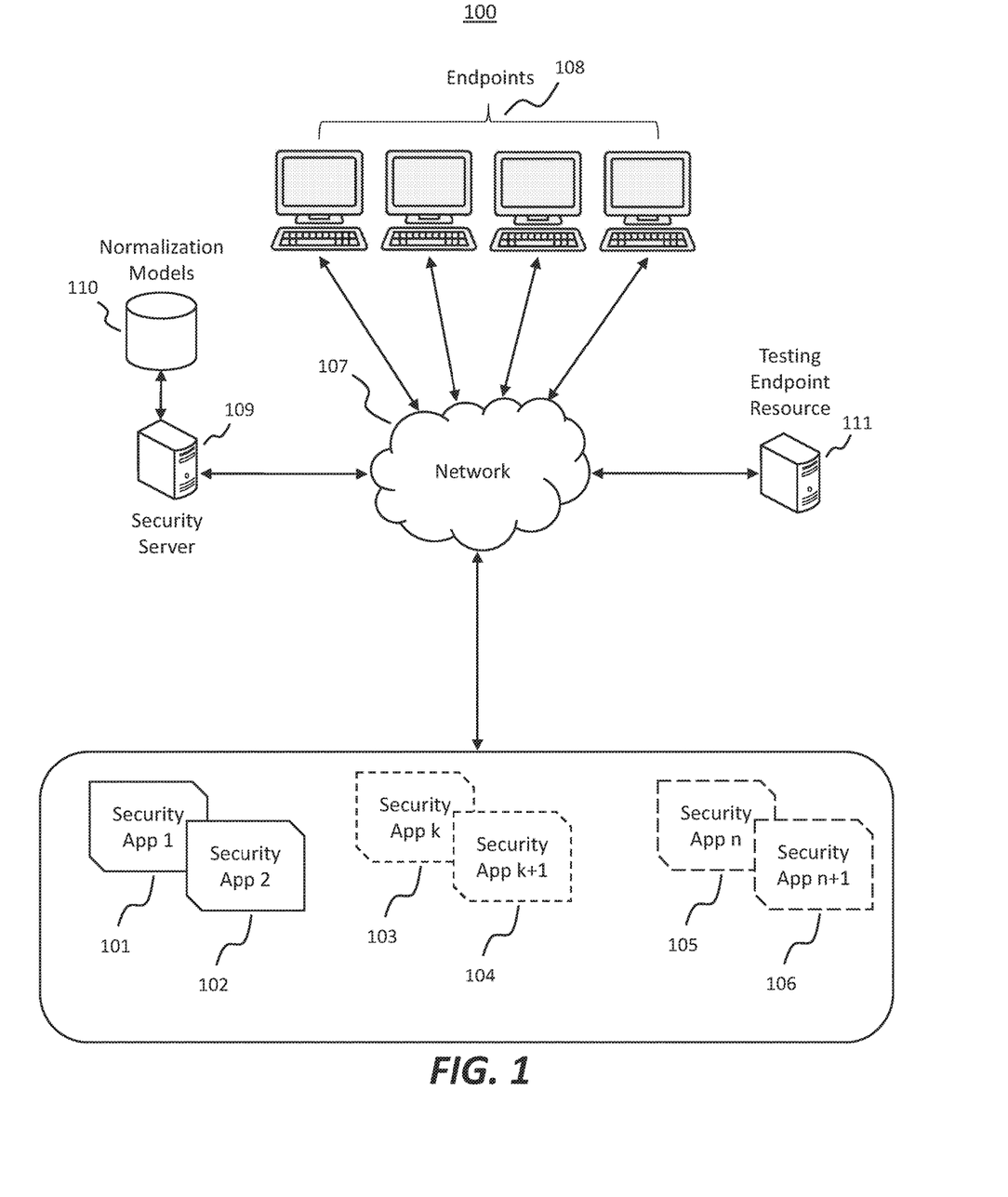
FIG. 1 is a block diagram of an exemplary system for identifying inconsistencies between network security applications in accordance with disclosed embodiments.

FIG. 1 illustrates a block diagram of an exemplary system 100 for identifying inconsistencies between network security applications. While FIG. 1 includes a variety of different endpoint resources 108, security applications 101-106, and other components, fewer or additional components may be implemented in accordance with the disclosed techniques.

As illustrated in FIG. 1, system 100 may include one or more endpoint resources 108. In various embodiments, endpoint resources 108 may take several different forms. For example, each of endpoint resources 108 may be a personal computer (e.g., desktop, laptop, micro PC, etc.), a handheld device (e.g., a mobile phone, a tablet, or a notebook), a wearable device (e.g., a smart watch, smart jewelry, an implantable device, a fitness tracker, smart clothing, a head-mounted display, etc.), a virtual instance (e.g., virtual machine, container instance, serverless code instance, etc.), or various other types of network resources capable of processing and/or receiving data. As described further below, some or all of endpoint resources 108 may be protected by one or more of security applications 101-106.

In accordance with system 100, the endpoint resources 108 may communicate with security applications 101-106 through network 107. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, NFC, infrared, etc.), or various other types of network communications. In some embodiments, the communications may take place across two or more of these forms of networks and protocols. The network 107 may be an on-premises network (e.g., LAN network), a virtual computing network, or a combination (e.g., hybrid) of both. In embodiments where network 107 is at least in part a virtual or cloud computing network, a variety of virtualization platforms may be used, such as Amazon Web Services™, Microsoft Azure™, Microsoft Containers™, Docker Containers™, Kubernetes™, and various others.

Security applications 101-106 may be a variety of different security applications deployed in conjunction with network 107 (e.g., in an enterprise network, or in a cloud network implemented to protect an enterprise). Consistent with the description above, security applications 101-106 may each have one or more dedicated security functions. For example, some of security applications 101-106 may address malware or viruses on endpoints 108, others may address email communication security for endpoints 108, others may address file downloads to endpoints 108, others may address outbound network communications from endpoints 108, others may address incoming network communications to endpoints 108, others may address obtaining privileges for endpoints 108 from a vault (e.g., CyberArk™ vault), others may address behavioral analysis of identities operating endpoints 108, others may focus on DevOps (e.g., continuous development or continuous deployment) processes in which endpoints 108 participate, others may address access by endpoints 108 to a source code repository, and others may address other functionality by endpoints 108.

In an enterprise environment where different discrete functionality is protected by individual security applications 101-106, inconsistencies are likely to arise. For example, a behavioral analysis security application may detect that a particular identity associated an endpoint resource 108 is very unlikely to access a particular database between the hours of 8:00 pm-6:00 am ET, and may thus block such access. On the other hand, a network communications security application may have placed the identity on a whitelist for purposes of accessing the database, and thus a conflict may arise between the two security applications. As another example, one security application may allow only a defined group of identities to spin up new virtual container (e.g., Docker™ container) instances, while another security application may grant such privileges to any identity accessing the virtual orchestration environment even if they are not in the defined group. Here too, a conflict between security policies may arise. Additional types of conflicts may arise based on inconsistent timing data for security applications. For example, a first security application may dictate that access to a server is prohibited (e.g., for maintenance) between 1:00 am-2:00 am ET every Monday, while a second security application may be configured to retrieve data from the server every Monday at 3:00 am ET. While no conflict may arise if both security applications operate according to the ET time zone, conflicts could arise if either security application shifts its time zone. For example, it would be a conflict if access to the server was disabled at a time data was to be retrieved from the server. Techniques for identifying and addressing such conflicts, and other types of security policy conflicts, are discussed further below.

FIG. 1 also illustrates a security server 109 in communication with a normalization model storage 110. Security server 109, as further discussed below, may perform operations for analyzing individual network security applications 101-106, identifying conflicts among the applications 101-106, and resolving the conflicts. In some embodiments, network security applications 101-106 may have defined security policies that comply with a normalization model. In such situations, the policies may be stored in normalized format in normalization model storage 110, which may be a database or other storage, either integrated into security server 109 or separate. Examples of normalized security policies are discussed further below in connection with FIGS. 2-4. Example operations of security server 109 are described further below in connection with FIGS. 5-6.

System 100 also includes a testing endpoint resource 111. As discussed further below, testing endpoint resource 111 may be a sandboxed machine or a virtualized machine (e.g., virtual machine such as a VMware™ machine or Azure™ virtual machine, or a container instance such as a Docker™ container or AWS™ container). Testing endpoint resource 111 may run network security applications 101-106 that do not have a defined or standardized security policy. For example, for some network security applications 101-106, their security rules may be embedded into their source code but not defined in a standardized manner. As another example, some network security applications 101-106 may operate according to artificial intelligence or machine learning techniques, such that a defined or standardized statement of their rules is not available. In such instances, network security applications 101-106 that do not have a defined or standardized security policy may execute on testing endpoint resource 111 so that their operation may be observed. For example, in some embodiments testing endpoint resource 111 may determine their operation by feeding them an image of actual network traffic (e.g., traffic to or from endpoints 108). In further embodiments, testing endpoint resource 111 may execute network security applications 101-106 using testing network communications traffic (e.g., predeveloped communications designed to invoke different functionality by network security applications 101-106). As discussed further below, once testing endpoint resource 111 is done with executing the network security applications 101-106, it may create standardized security models or profiles for them and store the profiles in normalization model database 110.

Endpoints 108 may, as discussed above, be a variety of types of computing resources that are protected by one or more of network security applications 101-106. For example, endpoints 108 may be personal computers (e.g., laptops, desktops, mobile devices, tablets, smart clothing, etc.) in an on-premises network (e.g., a LAN). Further, endpoints 108 may be virtual computing instances spun up in a cloud computing environment (e.g., based on AWS™, Azure™, IBM Cloud™, etc.). In such embodiments, endpoints 108 may be virtual machines (e.g., based on VMWare™ AWS™ virtual machines, etc.), container instances (e.g., Docker™ containers, AWS™ containers, Kubernetes™ containers, etc.), or serverless code instances (e.g., AWS™ Lambda instances, Azure™ Functions, etc.). In further embodiments, endpoints 108 may be IoT devices. For example, endpoints 108 may be a variety of types of network-connected automobiles, sensors, surveillance equipment, machinery, appliances, lighting, physical access control devices, entertainment devices, etc. In some embodiments, endpoints 108 may be a combination of the above types of computing resources.

Figure 2:
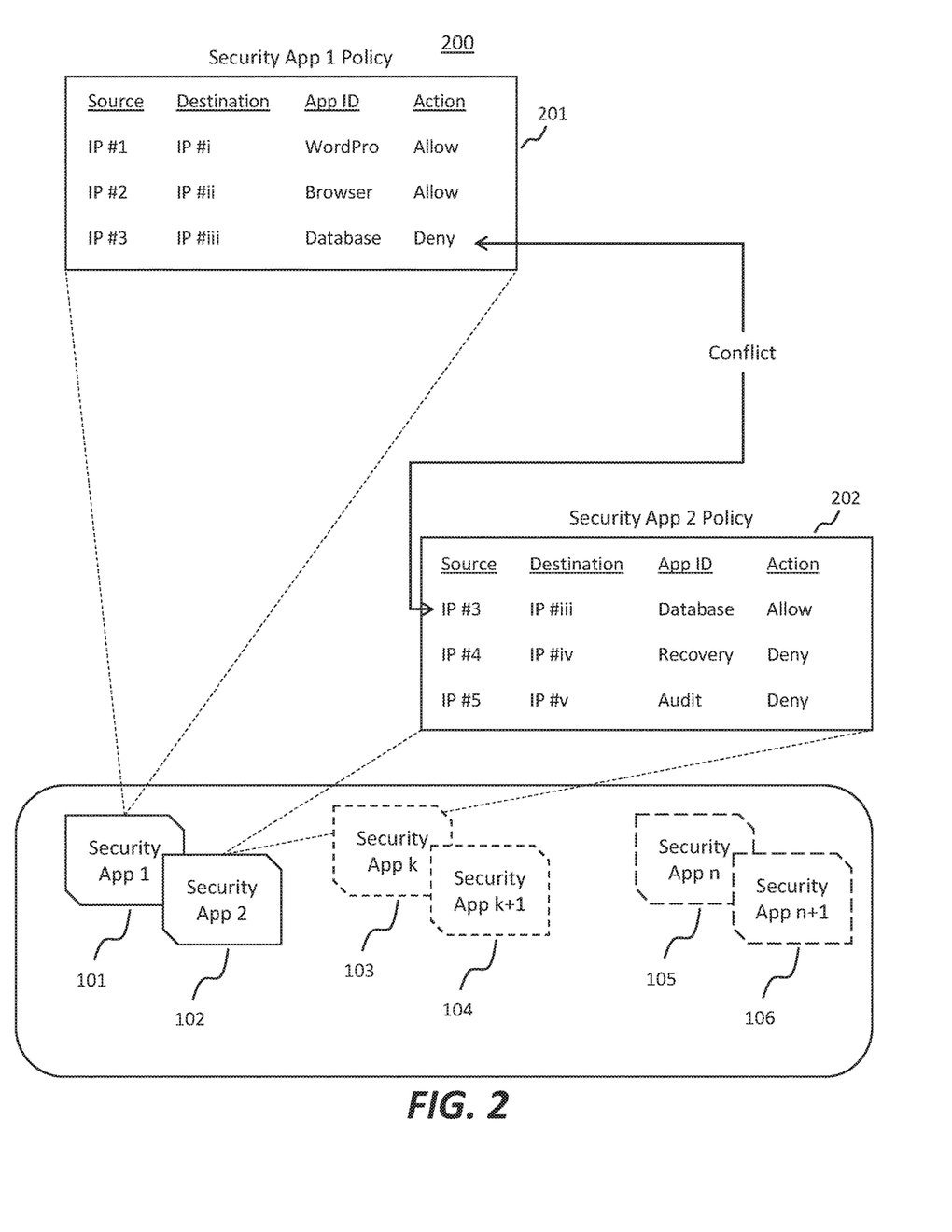
FIG. 2 is a block diagram of an exemplary system for identifying a conflict among network security policies in accordance with disclosed embodiments.

FIG. 2 illustrates a block diagram of an exemplary system 200 for identifying a conflict among network security policies. Consistent with FIG. 1, the conflict detection operations discussed below may be performed by security server 109.

In the illustrated example, security application 101 has a corresponding policy 201, and security application 102 has its own policy 202. According to this example, both policies 201, 202 comply with a policy standardization model. In particular, both policies are defined as including attributes of Source, Destination, App ID, and Action, among possibly various other attributes. As discussed above, in some embodiments both policies may also have corresponding timing data (e.g., times actions are to be performed, time durations, time zones, etc.). In accordance with FIG. 1, the policies 201, 202 may specify rules for network activities, such as communications to and/or from one or more of endpoints 108. In some embodiments, security policies 201, 202 may be stored in normalization model database 110.

While several of the rules in security policies 201, 202 are consistent and do not cause conflicts, one illustrated rule does cause a conflict. In particular, the first two rules of policy 201 address Source values of IP #1 and IP #2, while the last two rules of policy 202 address Source values of IP #4 and IP #5. These four rules do not conflict in this example because they are addressing different source IP addresses. In addition, these four rules address different Destination and App ID values. Nevertheless, there is a conflict between the third rule of policy 201 and the first rule of policy 202. These two rules relate to the same Source (IP #3), Destination (IP # iii), and App ID (Database), but specify different values for the security policies' respective Action. While policy 201 specifies an Action of "Deny" policy 202 specifies an Action of "Allow," which means that the two policies conflict. Both policies cannot be enforced concurrently because they lead to different actions.

It should be noted that, depending on timing data associated with policy 201 and policy 202, a conflict may or may not exist as described above. For example, if timing is not considered and the "Action" of each policy is applicable across all times, a conflict will arise as noted above. Nevertheless, if policy 201 and policy 202 each limit their "Action" to only occurring at different times (e.g., absolute times, time windows or durations, time zones, etc.), a conflict may not exist. That is, no conflict may arise if the "Action" of "Deny" in policy 201 is performed at a different time (or only applicable at a different time) from the "Action" of "Allow" in policy 202. Accordingly, in embodiments where timing data of security policies 201 and 202 is considered, additional granularity regarding conflicts may be achieved.

In some embodiments, the conflict detection operations of FIG. 2 may be configured to identify absolute conflicts between opposite Actions (e.g., between "Deny" and "Allow" Actions). In other embodiments, the conflict detection may identify conflicts that are not absolute or opposite, but rather simply have different Actions. For example, another rule of policy 201 may allow a particular network behavior monitoring function to run, and may state that a result of the monitoring function is stored in an audit database with IP address 64.206.1.3. At the same time, another rule of policy 202 may also allow the monitoring function to run, but may state that the result of the monitoring function is stored in a different audit database with IP address 66.208.3.5. In this situation, while part of the Action (i.e., allowing the monitoring function to run) is consistent between the two policies 201 and 202, part is not (i.e., the location of the audit database). In this manner, in some embodiments the conflict detection process of FIG. 2 may be configured to identify conflicts whenever there is not a complete match between the Action values of the respective policies. Other variations on this conflict detection process are possible as well.

Figure 3:
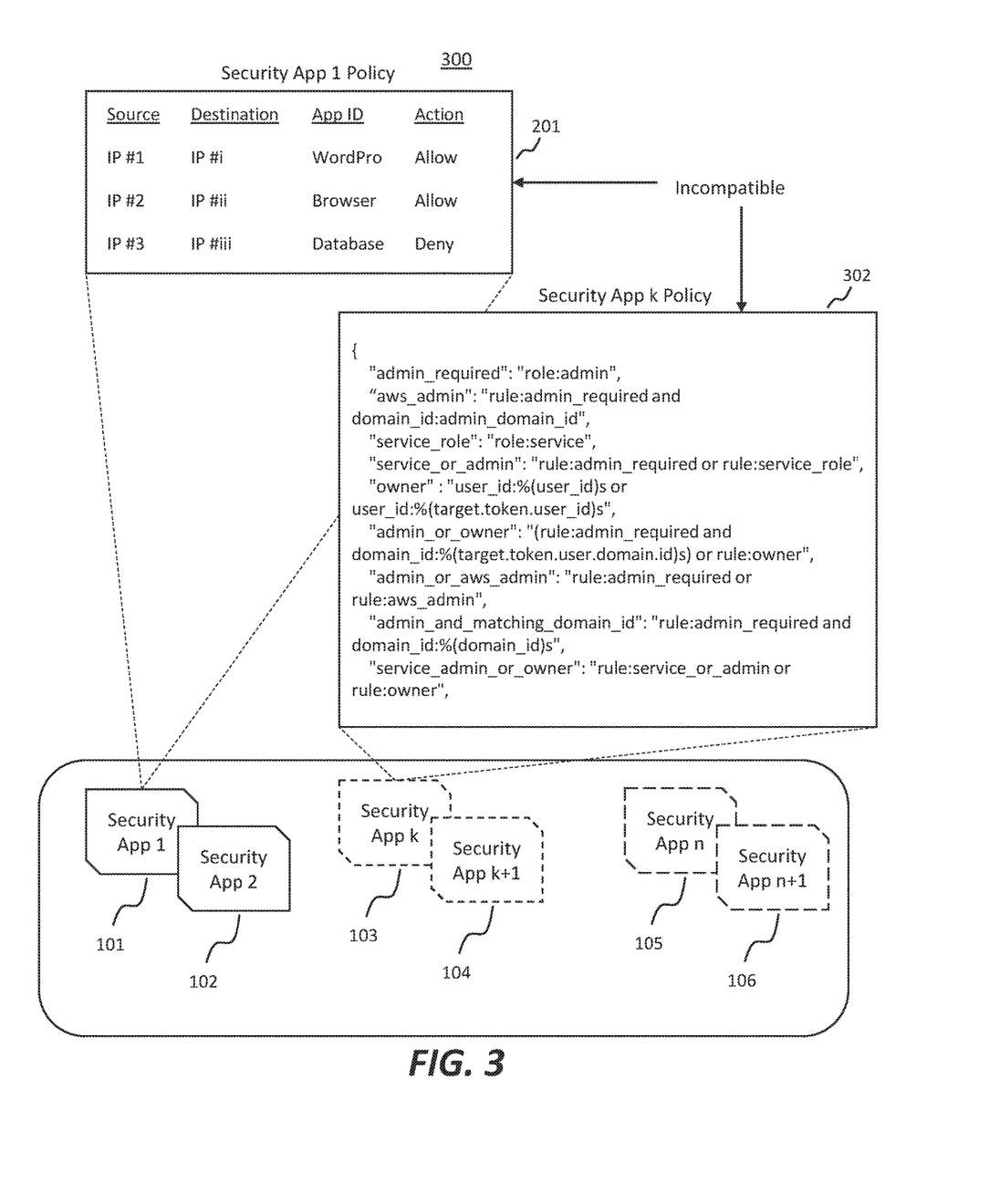
FIG. 3 is a block diagram of an exemplary system for identifying an incompatibility among network security policies in accordance with disclosed embodiments.

FIG. 3 illustrates a block diagram of an exemplary system 300 for identifying an incompatibility among network security policies. Like system 200, system 300 includes a standardized security policy 201 corresponding to security application 101. As discussed above, this standardized policy may be stored in normalization model database 110. Consistent with FIG. 1, the conflict detection process of FIG. 3 may be performed at testing endpoint resource 111 and/or at security server 109.

In contrast to system 200, which considered a standardized policy 202 corresponding to security application 102, system 300 includes a non-standardized policy 302 corresponding to security application 103. Thus, for purposes of determining whether there are conflicts between policy 201 and policy 302, a comparison according to the standardized model that policy 201 follows will not be sufficient. In the example of system 300, security policy 302 may be an OpenStack policy defining access rights. For example, the security policy 302 may be written according to a data-interchange format such as JavaScript Object Notation (JSON), Extensible Markup Language (XML), asynchronous JavaScript and XML (AJAX), etc. In the illustrated example, policy 302 may be a JSON policy file specifying access rights for creating, updating, modifying, or deleting virtual computing resources based on whether an identity has "aws_admin" access privileges.

As noted above, since policy 302 does not adhere to the same standardized format as policy 201, conflicts cannot be detected between the two policies based on a comparison using the standardized format of policy 201, Instead, in accordance with FIG. 3, testing endpoint resource 111 may execute security application 103 based on its security policy 302. As discussed above, in some embodiments this may involve running security application 103 on testing endpoint resource 111 based on a copy of actual network traffic (e.g., traffic to and/or from one of endpoints 108). Further, in some embodiments the testing may involve feeding the security application 103 fictitious or testing data that is designed to probe various different functionality of security application 103. In some embodiments, testing endpoint resource 111 may be configured to emulate or mirror a particular one of endpoints 108. Further, the security application 103 being analyzed may be copied, together with all of its properties, to testing endpoint resource 111 for the testing. The properties may include a variety of parameters, such as executed user or identity, execution date or time, file location path or address, file name, file size, file hash, publisher, file type, creation date or time, update date or time, origin or source information, author, etc.

Once the execution of security application 103 is observed on testing endpoint resource 111, a standardized security model may be created for it. For example, a security model adhering to the same format as policies 201 and 202, as discussed above in connection with FIG. 2, may be created for policy 302. The security model for security policy 302 may be created by populating a rules-based table, such as shown in FIG. 2, based on the operation of policy 302, as well as corresponding timing data as discussed above. For example, for Source IP #1, Destination IP # i, and App ID Word Pro, testing endpoint resource 111 may determine what Action security policy 302 performs. This may involve, for instance, a word processing application running on one of endpoints 108 seeking to communicate with a particular file storage site having a particular IP address. Security policy 302 may have a variety of different types of Action values for this operation, such as "Allow," "Deny," "Fetch Privileges," "Allow and Audit Report," "Deny and Send Alert," etc. As discussed above, a conflict may exist in some embodiments only if security policy 302 has an absolutely different or opposite Action compared to policy 201 (e.g., "Allow" compared to "Deny"). In other embodiments, a conflict may be identified if the Action values do not completely match (e.g., "Allow" compared to "Allow and Audit Report"). Other variations on this conflict detection process are possible as well.

Figure 4:
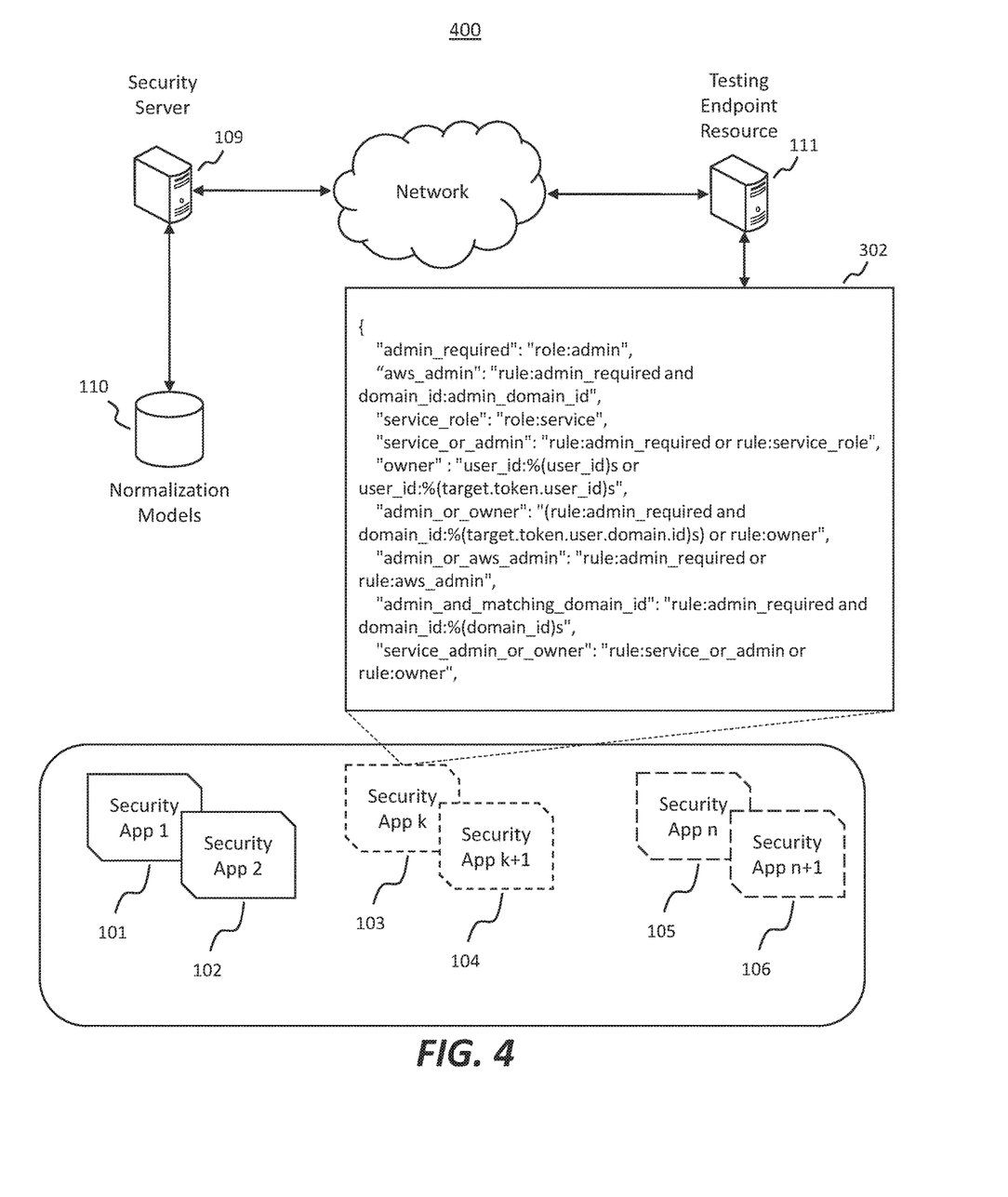
FIG. 4 is a block diagram of an exemplary system for analyzing an incompatible network security policy in accordance with disclosed embodiments.

As shown in FIG. 4, once testing endpoint resource 111 generates a standardized security model corresponding to security policy 302, testing endpoint resource 111 may transmit the standardized model to security server 109 for storage in normalized model database 110. In some embodiments, the conflicts detection process described above in connection with FIG. 3 may be performed as soon as the standardized model based on policy 302 is created. Further, in some embodiments security server 109 may be configured to periodically or automatically compare standardized security profiles stored in normalization model database 110. Security server 109 may perform this conflicts detection process periodically (e.g., daily, weekly, etc.) or upon detecting changes to the standardized security policies that it stores in database 110 (e.g., based on software updates, patches, upgrades, fixes, version changes, etc.). In this manner, the network environment in which security applications 101-106 and endpoints 108 operate may regularly or continuously be protected against conflicts among the security policies of security applications 101-106.

Various types of security applications and resulting conflicts may be detected in accordance with FIGS. 2-4 as discussed above. As one example scenario, a first security application (Applications) may have a corresponding security policy (Policy$_1$) which permits access to a shared network resource (e.g., database, server, file, virtual machine, etc.) only for users in a particular group (Group$_A$). Concurrently, a second security application (Application$_2$) may have a corresponding security policy (Policy$_2$) which impersonates execution for a set of applications or processes to run as a user from Group$_A$ with their permissions or privileges. In this example, a user (User$_B$) who is not part of Group$_A$ may execute an application or process. Here, if Policy$_2$ is first to run, it may allow User$_B$ to use the application or process and access the shared resource, since Policy$_2$ impersonates a valid user of Group$_A$. This would conflict with Policy$_1$, however, which only permits access to the shared resource by users within Group$_A$, and thus not User$_B$. Accordingly, consistent with FIGS. 2-4 this type of conflict between Policy$_1$ and Policy$_2$ may be identified.

As another example, a first security application (Application$_1$) may have a corresponding security policy (Policy$_1$) that enforces a whitelist of a first set of applications or processes that may run, and blocks all other applications or processes from running. Concurrently, a second security application (Application$_2$) may have a corresponding security policy (Policy$_2$) which impersonates execution for the set of applications or processes to run with elevated (e.g., administrator) privileges. In this situation, if Policy$_2$ is first to act when User$_B$ attempts to use one of the applications or processes not in the first set (i.e., the whitelisted set), User$_B$ may be permitted to use the applications or processes since they may be granted the administrator privileges. This conflicts with Policy$_1$, however, which would have restricted use of such applications or processes since they are not whitelisted. This is also the type of conflict that may be detected in accordance with FIGS. 2-4 above.

Figure 5:
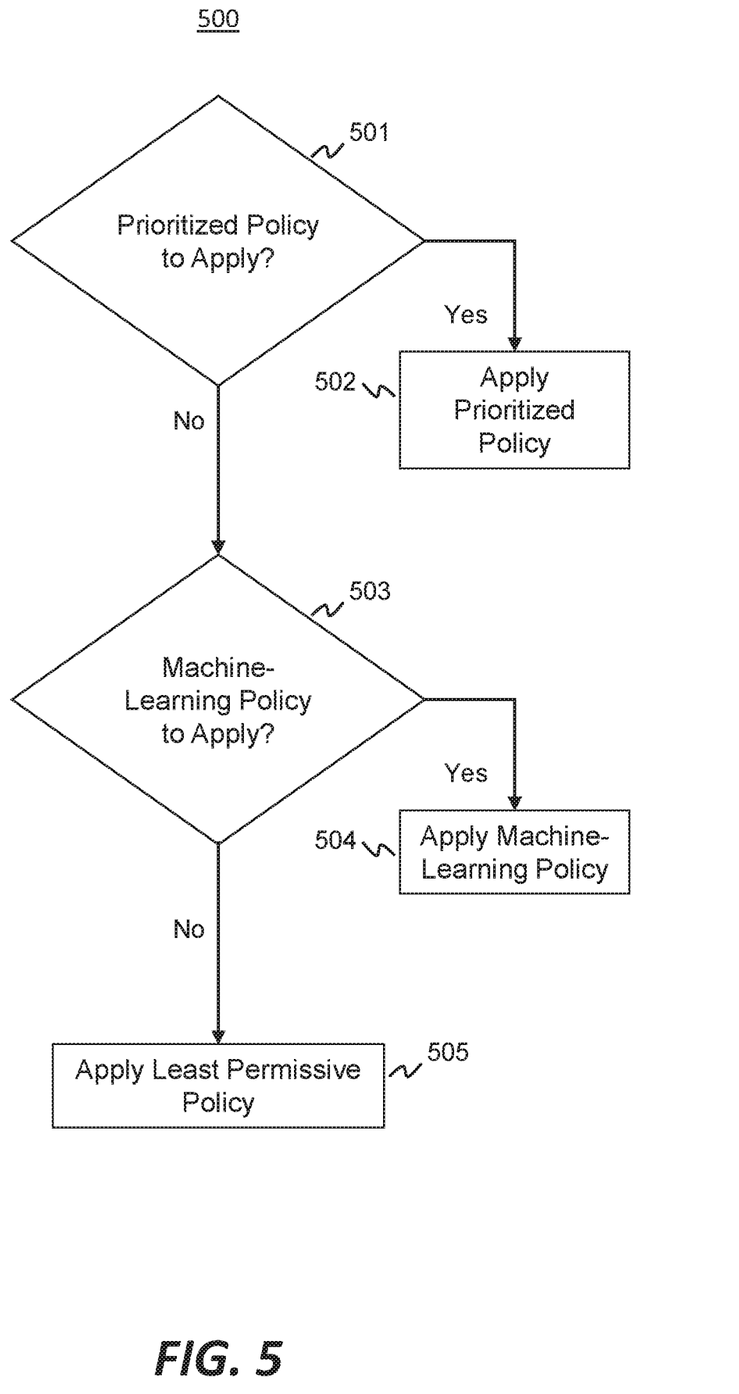
FIG. 5 is a flowchart depicting an exemplary process for automatically resolving a conflict among network security policies in accordance with disclosed embodiments.

FIG. 5 is a flowchart depicting an exemplary process 500 for automatically resolving a conflict among network security policies. In accordance with FIG. 1, above, process 500 may be performed by security server 109. Further, process 500 may follow a conflicts detection process, as described in connection with FIGS. 2-4. That is, in some embodiments process 500 may be performed if a conflict among security policies is detected in systems 200, 300, or 400.

Process 500 may include an operation 501 of determining whether a prioritized policy has been designated in the event of a conflict. For example, in the environment of system 200, a conflict may exist between security applications 101 and 102 (i.e., with respect to Source IP #3, Destination IP # iii, and App ID Database). As discussed above, in some embodiments the conflict is detected additionally based on timing data (e.g., absolute time, time windows or durations, time zones, etc.). In some embodiments, one of security applications 101 or 102 may have been designated as a prioritized policy. For example, a prioritized policy may be designated as prioritized if it handles critical or sensitive processes within a network environment, if t was more recently updated, or if it was assigned a prioritized designation. If one of the conflicting security applications 101 and 102 has a policy that has been prioritized in this manner, process 500 may continue to operation 502 and the prioritized policy may be applied. This may automatically resolve the conflict between the two conflicting security applications 101 and 102, since one will be given effect over the other.

Alternatively, if the conflicting security applications 101 and 102 have not been prioritized (or have both been prioritized), process 500 may continue to operation 503. In operation 503, process 500 may include determining whether there is a machine learning policy to apply to resolve the conflict. For example, in some embodiments a classification algorithm may be employed to analyze the conflicting security policies as well as other standardized security models stored in database 110. The classification algorithm may identify, for example, patterns among the identified inconsistencies between policies. For example, if there are five security policies in database 110 that each have an "Action" corresponding to a particular "Source," "Destination," and "App ID," as discussed above in connection with FIG. 2, operation 503 may include analyzing the "Action" value of each of the five policies. If all (or a majority) of the policies have the same "Action" value (e.g., "Allow"), the machine learning analysis in operation 503 may select that "Action" value for purposes of resolving the conflict in operation 504. As another example, in some embodiments database 110 may store indications of how security policy conflicts have been resolved previously (e.g., by security administrators). If these stored indications reveal that in five prior instances where a conflict was detected having particular "Source," "Destination," and "App ID" values, a security administrator resolved the conflict in a particular way (e.g., selecting "Deny and Send Alert" as the "Action"), that same Action may be applied in operation 504 to resolve the conflict among policies in accordance with process 500.

In some embodiments, no machine learning model may be available to apply in operation 503, Alternatively, a machine learning model may have been applied but may not result in a particular "Action" being selected to resolve the conflict. This may occur, for example, if the machine learning model operation 503 is not capable of finding any relevant pattern, or finds a relevant pattern but with a confidence falling below a threshold (e.g., a confidence of 30% falling below a confidence threshold of 90%). In these embodiments; process 500 may continue to operation 505 of applying a least permissive policy to resolve the conflict. For example, if the conflict involves "Action" values of "Allow" and "Deny," the "Action" of "Deny" may be chosen in operation 505 to resolve the conflict since it is less permissive than "Allow," Similarly, if the conflict involves "Action" values of "Allow with Admin Privileges" or "Allow with Least Privileges," the "Action" of "Allow with Least Privileges" may be selected as the least permissive operation. In some embodiments, for example, the "Allow with Least Privileges" Action may be chosen according to a least-privilege policy (e.g., stored at security server 109). The least-privilege policy may have definitions of minimal scopes of privileges (e.g., minimal privilege levels, minimal durations of holding privileges, etc.) that correspond to specific actions. For example, the least-privilege policy may specify that the privileges needed to have read-only access to a database include one-time usage credentials that are below the level of administrator credentials. By limiting the privileges assigned in this manner, the least-privilege policy may guard against identities receiving unnecessarily strong privileges, or privileges for an unnecessarily long duration. In accordance with operation 505, "Action" values determined based on the least-privilege policy may be deemed to be least permissive compared to "Action" values not determined based on the least-privilege policy.

Figure 6:
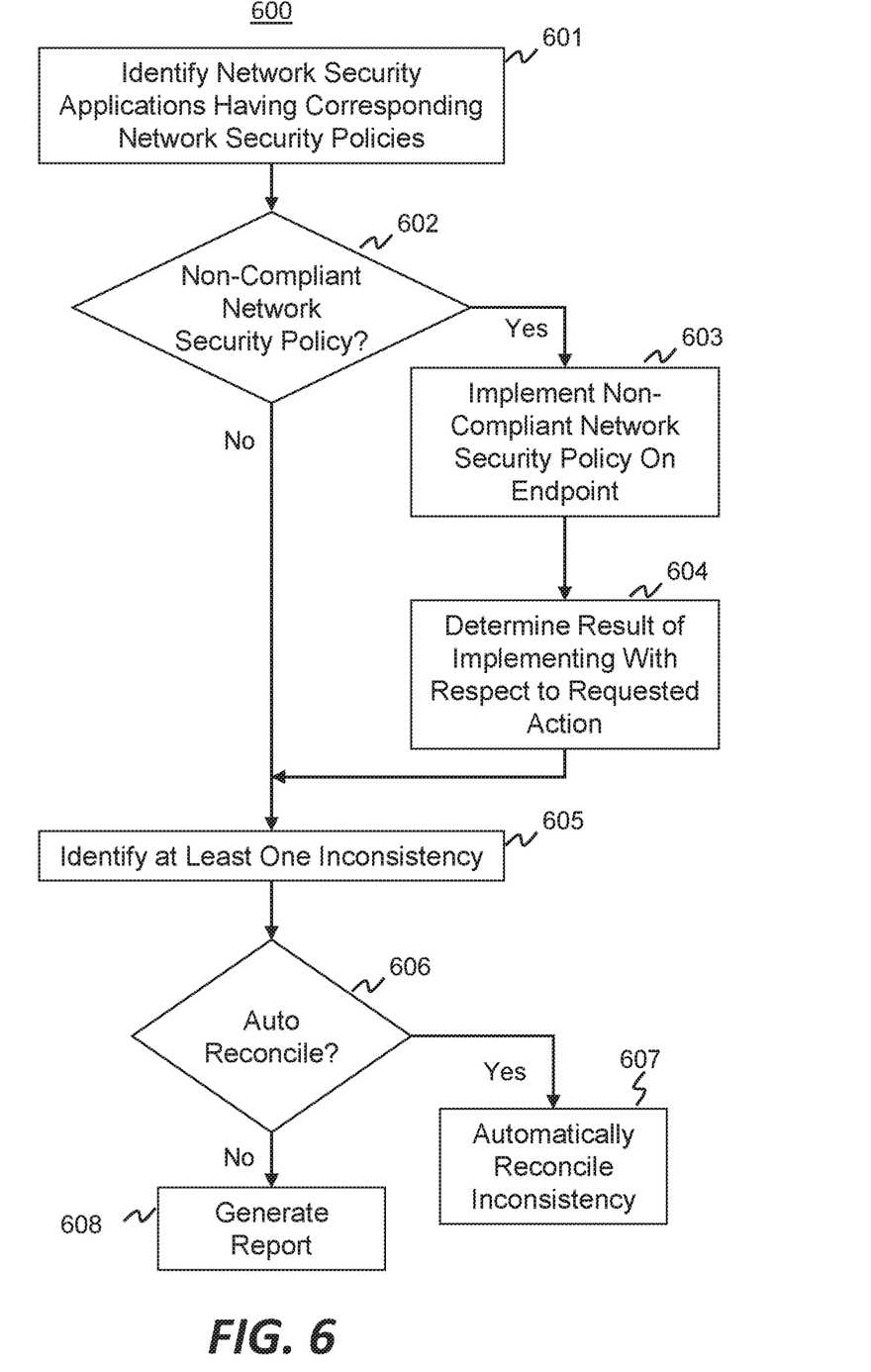
FIG. 6 is a flowchart depicting an exemplary process for identifying inconsistencies between network security applications in accordance with disclosed embodiments.

FIG. 6 is a flowchart depicting an exemplary process 600 for identifying inconsistencies between network security applications. Consistent with FIG. 1, above, process 600 may be performed by security server 109. Further, process 600 may follow a conflicts detection process, as described in connection with FIGS. 2-4, Accordingly, in some embodiments process 600 may be performed if a conflict among security policies is detected in systems 200, 300, or 400.

In operation 601, process 600 may include identifying a plurality of network security applications, each having a corresponding network security policy. For example, with reference to FIG. 1, this may involve identifying one or more of security applications 101-106, each having one or more security policies (e.g., policies 201, 202, and 302, as discussed in connection with FIGS. 2-4).

The plurality of network security applications may be identified in a variety of ways. For example, in some embodiments the plurality of network security applications may be identified through a central registry of applications running in a network environment. Further, in some embodiments the plurality of network security applications may be identified based on detecting their execution in the network environment. Other techniques for identifying the plurality of network security applications are possible as well.

In operation 602, process 600 may include determining whether at least one of the plurality of network security applications has a corresponding network security policy that does not comply with a normalization model. For example, as discussed above in connection with FIG. 2, some policies (e.g., policies 201 and 202) may be compatible with a normalization model (e.g., a standardized format including "Source," "Destination," "App ID," and "Action," among possibly other parameters). These normalization models and the corresponding policies that comply with them may be stored in database 110. On the other hand, as discussed in connection with FIGS. 3 and 4, some security policies (e.g., policy 302) may not comply with the normalization model. Accordingly, because such policies do not comply, they cannot readily be compared with other policies to detect conflicts based on values of policy parameters. If the policies identified in operation 601 are all compliant with the model (i.e., no non-compliant policies), process 600 may proceed to operation 605. On the other hand, if at least one policy is non-compliant, process 600 may proceed to operations 603 and 604, where the non-compliant policy may be normalized.

In operation 603, process 600 may include implementing the network security policy that does not comply with the normalization model on an endpoint computing resource. For such policies, such as policy 302 as discussed above, the policy may be run on a sandboxed or dedicated machine, such as testing endpoint resource 111. In some embodiments, the testing endpoint resource 111 may be configured to emulate one or more of endpoints 108. Further, testing endpoint resource 111 may be configured to execute the security application having the non-compliant policy in a manner that includes all of the properties of the security application, as discussed above.

In operation 604, process 600 may include determining a result of the implementing with respect to a requested action on the endpoint computing resource. For example, as discussed above, testing endpoint resource 111 may analyze the execution of the security policy and determine the specific decisions that it makes (e.g., allowing certain network actions, denying certain network actions, requiring fetching of privileges, sending reports, updating audit databases, etc.). This data may also include, in some embodiments, timing data, as described above. In some embodiments, the analyzed activity may be stored in the form of a standardized policy (e.g., in database 110). The standardized policy may define the rules of the security policy in accordance with the standardized or normalized model, thus allowing comparisons between security policies. For example, as discussed above, non-compliant policy 302 may be analyzed and represented in a standardized format (e.g., "Source," "Destination," "App ID," and "Action," as well as timing data, etc.).

In operation 605, process 600 may include identifying, based on the result of the implementing, at least one inconsistency between how the plurality of network security applications address the requested action. As discussed above, inconsistencies may arise in several different ways. For example, in some embodiments process 600 may identify inconsistencies only where two opposite or absolutely different security actions are provided by different security applications (e.g., "Allow" and "Block"). Alternatively, in some embodiments process 600 may identify inconsistencies where the security actions of different security applications are not identical. For example, the actions of "Allow" and "Allow and Update Audit Database" are not identical, and may be considered a conflict. Similarly, "Deny" and "Deny and Send Alert" are not identical, and may likewise be considered in conflict. Further, as discussed above, the presence of a conflict may also be based on timing data between the policies being analyzed. Consistent with the discussion above, the specific types of conflicts identified in operation 605 will be implemented through the configuration of security server 109.

In operation 606, process 600 may include determining whether to perform an automatic conflicts reconciliation process. For example, operation 607 may include performing the automatic reconciliation process described above in connection with FIG. 5. Accordingly, process 500 may be performed as described above in operation 607. Alternatively, if no automatic reconciliation process is available, if such a process is not selected, or if such a process fails to yield a network action that resolves the conflict, then process 600 may continue to operation 608 of generating a report. For example, the report may identify the conflict (e.g., identify the respective security applications and/or their respective security policies). Further, in some embodiments the report may identify what specific circumstance (e.g., based on source, destination, application identifier, and action, as discussed above) caused the conflict. In some embodiments, the report may further allow for a selectable option for resolving the conflict. For example, the selectable option may include resolving the conflict discretely and on a one-time basis. Alternatively, in some embodiments the selectable option may allow for prioritizing one application over the other, which may result in conflicts between the two applications being decided in the future in favor of the prioritized application.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for identifying inconsistencies between network security applications, the operations comprising:
   identifying a plurality of network security applications, each having a corresponding network security policy;
   determining that at least one of the plurality of network security applications has a corresponding network security policy that does not comply with a normalization model;
   implementing the network security policy that does not comply with the normalization model on an endpoint computing resource;
   determining a result of the implementing with respect to a requested action on the endpoint computing resource;
   identifying, based on the result of the implementing, at least one inconsistency between how the plurality of network security applications address the requested action; and
   performing; based on the identifying of the inconsistency, at least one of:
      generating a report identifying the inconsistency, or
      reconciling the identified inconsistency.

2. The non-transitory computer readable medium of claim 1, wherein reconciling the identified inconsistency includes implementing a least-privilege policy, the least-privilege policy specifying at least one of: a scope of privileged access for the requested action, or a duration of privileged access for the requested action.

3. The non-transitory computer readable medium of claim 1, wherein the normalization model includes defined parameters of the plurality of network security applications, the defined parameters including at least rules for: blocking or allowing operations with privileged access permissions, and blocking or allowing access to resources.

4. The non-transitory computer readable medium of claim 1, wherein the normalization model is developed by running a synchronization process on a plurality of security parameters of the plurality of network security applications.

5. The non-transitory computer readable medium of claim 1, wherein the security parameters are based on one or more of: identity data, execution time, execution argument, file location, file name, file size, file hash, publisher, file type, creation time, update time, origin, author, privilege level, input, and output.

6. The non-transitory computer readable medium of claim 1, wherein identifying the at least one inconsistency includes:
   identifying at least one of the plurality of network security applications that has a corresponding network security policy that does comply with the normalization model;
   determining a treatment of the requested action on the endpoint computing resource based on the at least one of the plurality of network security applications that has the corresponding network security policy that does comply with the normalization model; and
   comparing the determined treatment to the result of the implementing with respect to the requested action on the endpoint computing resource.

7. The non-transitory computer readable medium of claim 1, wherein implementing the network security policy that does not comply with the normalization model on the endpoint computing resource includes implementing the network security policy on a virtualized computing resource.

8. The non-transitory computer readable medium of claim 7, wherein implementing the network security policy on the virtualized computing resource includes executing a program implementing the network security policy on the virtualized computing resource.

9. The non-transitory computer readable medium of claim 1, wherein the operations further comprise determining that a first and a second of the plurality of network security applications have corresponding network security policies that do not comply with the normalization model.

10. The non-transitory computer readable medium of claim 9, wherein the operations further comprise implementing the corresponding network security policies for the first and the second of the plurality of network security applications, respectively, on a first and a second endpoint computing resource.

11. A computer-implemented method for identifying inconsistencies between network security applications, the method comprising:
   identifying, at a security server computer resource, a plurality of network security applications, each having a corresponding network security policy;
   determining that at least one of the plurality of network security applications has a corresponding network security policy that does not comply with a normalization model;
   implementing the network security policy that does not comply with the normalization model on an endpoint computing resource;
   determining a result of the implementing with respect to a requested action on the endpoint computing resource;
   identifying, based on the result of the implementing, at least one inconsistency between how the plurality of network security applications address the requested action; and
   performing, based on the identifying of the inconsistency, at least one of:
      generating a report identifying the inconsistency, or
      reconciling the identified inconsistency.

12. The computer-implemented method of claim 11, wherein reconciling the identified inconsistency includes presenting a selectable option for resolving the identified inconsistency.

13. The computer-implemented method of claim 11, wherein reconciling the identified inconsistency includes automatically resolving the identified inconsistency.

14. The computer-implemented method of claim 13, wherein automatically resolving the identified inconsistency includes:
   providing the identified inconsistency to a machine-learning classification system;
   receiving, from the machine-learning classification system, and based on the security parameters and the requested action, an operation for handling the requested action; and
   implementing the operation for handling the requested action.

15. The computer-implemented method of claim 14, further comprising updating the machine-learning classification system based on the implementing of the operation for handling the requested action.

16. The computer-implemented method of claim 13, wherein automatically resolving the identified inconsistency includes applying at least one of: a strictest network security policy corresponding to the plurality of network security applications, or a custom network security policy that comprises a prioritization of the plurality of network security applications.

17. The computer-implemented method of claim 13, wherein automatically resolving the identified inconsistency includes applying a least-privilege network security policy corresponding to the plurality of network security applications.

18. The computer-implemented method of claim 11, wherein the plurality of network security applications are a plurality of different network security applications.

19. The computer-implemented method of claim 11, wherein the result of the implementing with respect to the requested action includes at least one of: blocking or allowing the requested action.

20. The computer-implemented method of claim 11, wherein the result of the implementing with respect to the requested action includes at least one of: denying or granting access to a privileged access credential.

* * * * *